Patented Oct. 9, 1951

2,570,408

UNITED STATES PATENT OFFICE

2,570,408

PROCESS FOR PRODUCING MERCUROUS CHLORIDE CRYSTALS

Norman Van Gorder, Scotch Plains, William Horback, Irvington, and Amerigo F. Caprio, Madison, N. J., assignors to Celanese Corporation of America, a corporation of Delaware No Drawing. Application August 14, 1948, Serial No. 44,394

2 Claims. (Cl. 23—87)

This invention relates to the preparation of mercurous chloride crystals having a silky, nacreous luster which are especially suited for incorporation into a plastic base to yield imitation pearl.

Imitation pearl is usually prepared by incorporating a silky variety of mercurous chloride into a plastic base. A process for preparing the silky variety of mercurous chloride is described in W. G. Lindsay U. S. Patent No. 1,809,449 and one of the steps of the process comprises reducing mercuric chloride, in a solution strongly acidified with hydrochloric acid, to mercurous chloride by slowly adding to the solution stannous chloride. In carrying out this step of the process, it is necessary to avoid the presence of an excess of stannous chloride, since any such excess will reduce all or a portion of the mercurous chloride crystals to black metallic mercury, which will destroy the nacreous luster of the mercurous chloride crystals, rendering them unsuitable for the production of imitation pearl. Accordingly, great caution has had to be observed in the reduction of the mercuric chloride to mercurous chloride by the use of stannous chloride.

Other factors which make the use of stannous chloride as the reducing agent unfavorable is that it is relatively expensive and in short supply at the present time.

It is an important object of this invention to provide a process for producing mercurous chloride crystals having a silky, nacreous luster which will be free from the foregoing and other disadvantages and which will employ a relatively inexpensive and readily available reducing agent.

A further object of this invention is to provide a process for producing mercurous chloride crystals having a silky, nacreous luster by reducing mercuric chloride with a tri-valent phosphorus compound.

Another object of this invention is to provide a process for producing mercurous chloride crystals having a silky, nacreous luster by reducing mercuric chloride with a tri-valent phosphorus compound in the presence of a salt which improves the silky, nacreous luster of the crystals formed.

A still further object of this invention is to provide a process for washing mercurous chloride crystals having a silky, nacreous luster in the presence of a material which prevents the loss of this luster.

Still another object of this invention is to provide mercurous chloride crystals having silky, nacreous luster which are coated with a layer of a protective colloid to improve their stability.

A still further object of this invention is to provide mercurous chloride crystals having a silky, nacreous luster which are coated with a layer of colored material to impart a different shade thereto.

We have now discovered that mercurous chloride crystals having a silky, nacreous luster may be prepared by reducing mercuric chloride with a tri-valent phosphorus compound. The process of our invention is particularly advantageous since the presence of an excess of tri-valent phosphorus compound will not reduce the mercurous chloride crystals to black metallic mercury. It is, therefore, possible to employ an amount of tri-valent phosphorus compound equivalent to or in excess of that required to reduce all the mercuric chloride and thereby avoid any loss of this material. It is also possible to mix the mercuric chloride and tri-valent phosphorus compound in any order desired, and although stirring is necessary during the mixing step to insure the formation of crystals of proper size it is not critical since the presence of local excesses of either reactant will not destroy the luster of the crystals. The process is also advantageous in that it may be carried out in a slightly acid or slightly alkaline medium, and it is therefore possible to avoid the corrosion problems attendant upon the use of the strongly acid reaction medium necessary when stannous chloride is the reducing agent. Moreover, in addition to being superior reducing agents for mercuric chloride, tri-valent phosphorus compounds are relatively inexpensive and readily available chemicals.

While various tri-valent phosphorus compounds such as phosphorous acid, phosphorus trichloride etc. in aqueous solutions with or without a solvent diluent such as acetone may be employed in accordance with our invention to effect the reduction of mercuric chloride to mercurous chloride crystals having a silky, nacreous luster, we prefer to employ phosphites in aqueous solutions for this purpose since they produce the highest yields of crystals having the desired luster. Among the phosphites which may be employed are the sodium, potassium or lithium phosphites as well as mixtures thereof.

The mercuric chloride may be employed as such or, if desired, there may be employed a solution of another mercuric salt such as mercuric acetate or mercuric nitrate, to which a soluble chloride has been added.

The concentration of the mercuric chloride in the reaction medium may range from as little as about 1.5% to as much as about 7% by weight. A preferred concentration is about 2.0% by weight which will, upon reduction, produce a quick-setting slurry of mercurous chloride crystals. The concentration of tri-valent phosphorus compound may range from about 0.3% to 2.5% by weight calculated as $Na_2HPO_3$. However, since one mole of a tri-valent phosphorus compound will reduce two moles of mercuric chloride to mercurous chloride, it is preferred to employ a molar concentration of tri-valent phosphorus compound approximately one-half as large as the molar concentration of mercuric chloride. Accordingly, when the concentration of mercuric chloride in solution is about 2.0% by weight, it is preferred that the concentration of tri-valent phosphorus compound, calculated as $Na_2HPO_3$, be about 0.5% by weight.

It is desirable to carry out the reduction of mercuric chloride with a tri-valent phosphorus compound in the presence of a chloride such as sodium or potassium chloride, or mixtures thereof, in a concentration ranging from about 1.0% to about 10% or more by weight. Although this chloride presumably takes no part in the reduction reaction we have found that its presence improves the silky, nacreous luster of the mercurous chloride crystals.

When a phosphite is employed as the tri-valent phosphorus compound, it may be prepared in any desired manner. For example, an alkali such as sodium carbonate, sodium bicarbonate, sodium hydroxide or the equivalent potassium or lithium salts or mixtures thereof may be added to a solution of phosphorous acid. It is preferable, however, from the viewpoint of economy to prepare the phosphite from phosphorus trichloride. A solution of this material in water will hydrolyze to yield a mixture of phosphorous and hydrochloric acids, from which a solution containing a phosphite may be readily obtained by adding an alkali thereto. When the phosphite solution is prepared in this manner, it will also contain a chloride such as sodium chloride which improves the silky, nacreous luster of the mercurous chloride crystals as has been pointed out above. It is not necessary that the quantity of alkali employed be equal to that required to exactly neutralize the phosphorous acid, or the mixture of phosphorous and hydrochloric acids. Instead the quantity of alkali may range from as little as 50% to as much as 200% of the quantity required for exact neutralization. As the quantity of alkali and the pH of the phosphite solution increase there will be a corresponding increase in the speed with which the mercuric chloride will be reduced and in the yield of mercurous chloride crystals. The pH of the solution may range from about 5 to 9, but for best results it is preferred to employ a pH of from about 6.5 to 8.5.

The reduction of mercuric chloride may be carried out at a temperature ranging from about 10 to 95° C. However, to avoid the necessity of artificially heating or cooling the solutions, it is preferred to carry out the reaction at room temperature which normally ranges from about 20 to 30° C. Equal yields of mercurous chloride may be produced at both temperatures by varying the reaction time from approximately 20 minutes at the higher temperature to approximately 40 minutes at the lower temperature.

After the reduction has proceeded to about 95% of completion the reaction mixture is acidified with an acid such as hydrochloric acid. This stops the reduction and prevents the formation of large mercurous chloride crystals having little or no luster which would otherwise be formed during the slow, final stages of the reduction. The addition of acid may be eliminated if washing is done within a sufficiently short time so that there is no opportunity for the formation of large lusterless crystals or agglomerates.

The mercurous chloride crystals are then permitted to settle and the liquid separated therefrom by decantation, filtration or in any other manner. Thereafter, the mercurous chloride crystals are washed, preferably by the addition of water with stirring, followed by settling and separation of the crystals. The washing step may be repeated as many times as is necessary to eliminate the soluble reaction products and any soluble impurities from the mercurous chloride crystals.

It has been discovered that the loss in luster which normally occurs during the washing step in large scale production and which is probably due to the formation of agglomerates may be largely avoided by adding from about 0.001 to 0.5% by weight of a protective colloid such as Mearlin F, gum arabic or gelatin to the wash water. Mearlin F is an aqueous dispersion of the calcium salt of hydrolyzed fish scales containing 35% of organic material. The presence of this small quantity of protective colloid in the wash water does not materially affect the efficiency of washing. It, however, eliminates the loss of luster hitherto attendant upon protracted washing, apparently by producing a thin coating of colloid upon the individual mercurous chloride crystals to prevent their agglomeration. The coated crystals are more stable in contact with water or reaction solutions and may therefore be left in contact with these solutions for a longer period of time. By employing a protective colloid which has a tan to brown color such as Mearlin F it is possible to impart a desirable warm cream shade to the mercurous chloride crystals and to the imitation pearl material produced therefrom. The protective colloid may not only be added to the wash water, but it may also be added to the reaction medium at any point before, during or after the reaction, to produce a coating on the mercurous chloride crystals. This coating will normally protect the luster of the crystals during washing, but in certain cases it may be lost during extended washing. It is, therefore, preferred to add a protective colloid to the wash water in all cases, whether or not a protective colloid has been added to the reaction mixture.

Instead of employing a protective colloid to prevent loss of luster during washing, it is also possible to employ from about .001 to 0.50% by weight of a wetting agent in the wash water to obtain this same effect. Although the exact mechanism by which the wetting agent functions is not known, it appears to prevent the agglomeration of the small lustrous crystals into larger non-lustrous particles by forming a coating on the individual crystals in a manner similar to the protective colloids. Suitable wetting agents are Aerosol OS (isopropyl-naphthalene-sodium sulfo-succinate), Aerosol OT (dioctyl ester of sodium sulfo-succinate) and soaps of various types. Moreover, Mearlin F which has been listed above as a protective colloid also functions as a wetting agent.

The water may then be displaced from the mercurous chloride crystals by means of a water miscible organic solvent such as methyl alcohol, ethyl alcohol, dioxane, tetramethylene oxide, "cellosolve" etc. after which the crystals may be used as such or incorporated into any other suitable liquid medium. Any liquid medium compatible with the plastic into which the mercurous chloride crystals are to be introduced may be employed for this purpose such as butyl acetate, benzene, toluene or mixtures thereof. In addition, a small quantity of a plastic binder may be added to the liquid medium to form an "essence" holding the mercurous chloride crystals in suspension. By mixing the mercurous chloride essence with a suitable plastic base, such as cellulose acetate, cellulose nitrate, polystyrene, polyethylene, polyvinyl esters, cellulose ethers, etc. as is well known in the plastic art, there will be produced an imitation pearl material.

In order further to illustrate our invention, but without being limited thereto, the following examples are given:

Example I

A stock phosphite solution is prepared by dissolving 244 parts by weight of phosphorus trichloride in 5850 parts by weight of water with stirring, not permitting the temperature to exceed 45° C. To this warm solution 1242 parts by weight of sodium bicarbonate are slowly added with stirring taking care that the solution does not foam over. A mercuric chloride solution is prepared by dissolving 240 parts by weight of mercuric chloride in 10,000 parts by weight of water and 1740 parts by weight of the stock phosphite solution added thereto over a period of 15 seconds with stirring, and stirring continued for 20 minutes with the solution at a temperature of 30° C. The reaction mixture is then acidified by the addition of 128 parts by weight of concentrated (35%) hydrochloric acid to stop the reduction reaction. The slurry of mercurous chloride crystals is diluted with 10,000 parts by weight of water, stirred for one minute and then permitted to settle for one-half hour. The supernatant liquid is removed by decanting and the process of diluting with 20,000 parts of water, stirring, settling and decanting repeated for a total of four washes. To each wash water except the first there is added 0.4 part by weight of Mearlin F. The washed crystals are filtered and the water displaced therefrom on the filter by adding 400 parts by weight of methyl alcohol. The methyl alcohol is permitted to drain from the crystals and the wet crystals containing about 50% methyl alcohol are incorporated into a "dope" comprising a 20% solution of cellulose nitrate, of medium viscosity, in butyl acetate to produce a pearl essence having a very faint cream color and containing about 12½% scales on a dry basis. An imitation pearl material is then prepared by incorporating 25 parts by weight of this pearl essence into 100 parts by weight of cellulose nitrate containing camphor as a plasticizer.

Example II

This example is carried out in a fashion similar to Example I, but 3.0 parts by weight of uncolored gelatin are substituted for the Mearlin F in the wash water and the addition of concentrated HCl eliminated. Since the gelatin is uncolored the imitation pearl material will not exhibit the faint cream color which is produced with the quantity of Mearlin F employed in Example I.

Example III

A solution is prepared by dissolving 61 parts by weight of phosphorus trichloride in 200 parts by weight of water with rapid stirring and cooling, and this solution is diluted by adding 300 parts by weight of water thereto. To 10 parts by weight of the solution is added 7.4 parts by weight of potassium bicarbonate producing a mixture of potassium chloride and potassium phosphite. A solution containing a mercuric salt and a chloride is prepared by dissolving 5.6 parts by weight of mercuric acetate and 25 parts by weight of sodium chloride in 200 parts by weight of water at 50° C. The phosphite solution is added to the latter solution at 50° C. over a period of 15 seconds with vigorous stirring and the stirring continued for a period of 5 minutes. The solution is then acidified with 2 parts by weight of concentrated (35%) hydrochloric acid to stop the reaction. The slurry of mercurous chloride crystals is poured into 800 parts by weight of water to which 0.025 part by weight of Aerosol OT have been added, stirred for one minute and allowed to settle for 30 minutes after which the wash water is decanted. The washing step is repeated as many times as is necessary to remove the soluble impurities from the crystals and they are thereafter filtered and incorporated into a plastic in the manner outlined in Example I.

It is to be understood that the foregoing detailed description is given merely by way of illustration and that many variations may be made therein without departing from the spirit of our invention.

Having described our invention, what we desire to secure by Letters Patent is:

1. Process for producing mercurous chloride crystals having a silky, nacreous luster, which comprises reacting mercuric chloride with a soluble, inorganic, debasic phosphite at a temperature of from 10 to 95° C. in a solution containing from about 1.5 to 7% by weight of the mercuric chloride, from about 0.3 to 2.5% by weight of the soluble, inorganic phosphite and from about 1 to 10% by weight of a chloride of the group consisting of sodium and potassium chloride and mixtures thereof which improves the luster of the crystals, acidifying the reaction mixture and washing the mercurous chloride crystals formed without material loss of luster, with water containing from about .001 to 0.50% by weight of a material selected from the class consisting of protective colloids and wetting agents.

2. Process for producing mercurous chloride crystals having a silky, nacreous luster, which comprises reacting mercuric chloride with dibasic sodium phosphite at a temperature of 30° C. in a solution containing about 2% by weight of the mercuric chloride, about 0.5% by weight of the dibasic sodium phosphite and about 5% by weight of sodium chloride, acidifying the reaction mixture with hydrochloric acid, and washing the mercurous chloride crystals formed without material loss of luster with water containing about 0.1% by weight of a material selected from the class consisting of protective colloids and wetting agents.

NORMAN VAN GORDER.
WILLIAM HORBACK.
AMERIGO F. CAPRIO.

REFERENCES CITED

The following references are of record in the file of this patent:

UNITED STATES PATENTS

| Number | Name | Date |
|---|---|---|
| 740,855 | Hoessle | Oct. 6, 1903 |
| 1,982,280 | Bell | Nov. 27, 1934 |

OTHER REFERENCES

Mellor: A Comprehensive Treatise on Inorganic and Theoretical Chemistry, vol. 4, pages 798, 800 and 801

Thorpe's Dictionary of Applied Chemistry, 4th edition, VII, pages 573, 574 and 575. Copy in Division 59.

Certificate of Correction

Patent No. 2,570,408 — October 9, 1951

NORMAN VAN GORDER ET AL.

It is hereby certified that error appears in the printed specification of the above numbered patent requiring correction as follows:

Column 6, line 26, for "debasic" read *dibasic*; line 30, strike out "soluble, inorganic";

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*